Jan. 9, 1951  G. R. ERICSON  2,537,336
HIGH-PRESSURE METERING PUMP
Filed Feb. 18, 1948

INVENTOR
George R. Ericson

UNITED STATES PATENT OFFICE 2,537,336

HIGH-PRESSURE METERING PUMP

George R. Ericson, Kirkwood, Mo., assignor to Carter Carburetor Corporation, St. Louis, Mo., a corporation of Delaware Application February 18, 1948, Serial No. 9,159

4 Claims. (Cl. 103—151)

This invention relates to pumps, and more particularly to pumps of the type used for supplying fuel to the injector valves of internal combustion engines and the like, which may be required to handle liquids such as fuel oil and gasoline which have very low viscosity and very little lubricating value and must be capable of delivering accurately measured minute quantities of liquid under high pressure. These requirements have made it necessary to finish the plungers and cylinders by gauge-making methods, such as hand lapping, and the cost has been so excessive as to prevent the adoption of fuel injection systems for use with small high speed engines of the passenger car type. This is partially due to the fact that the lack of proper lubricant soon results in some wear and leakage around the pistons, so that the pump no longer delivers the exact quantity required at each stroke, and the cylinder and piston must soon be replaced.

The invention has for its main object the production of a cylinder and piston combination in which leakage is completely eliminated.

A further object of the invention is the production of an integral cylinder and piston combination, bonded together by a rubber bushing which acts in shear to permit the necessary relative movement of the piston with respect to the cylinder.

Other objects and advantages will be apparent from the following description and the accompanying drawings, referring to which:

Figure 1:
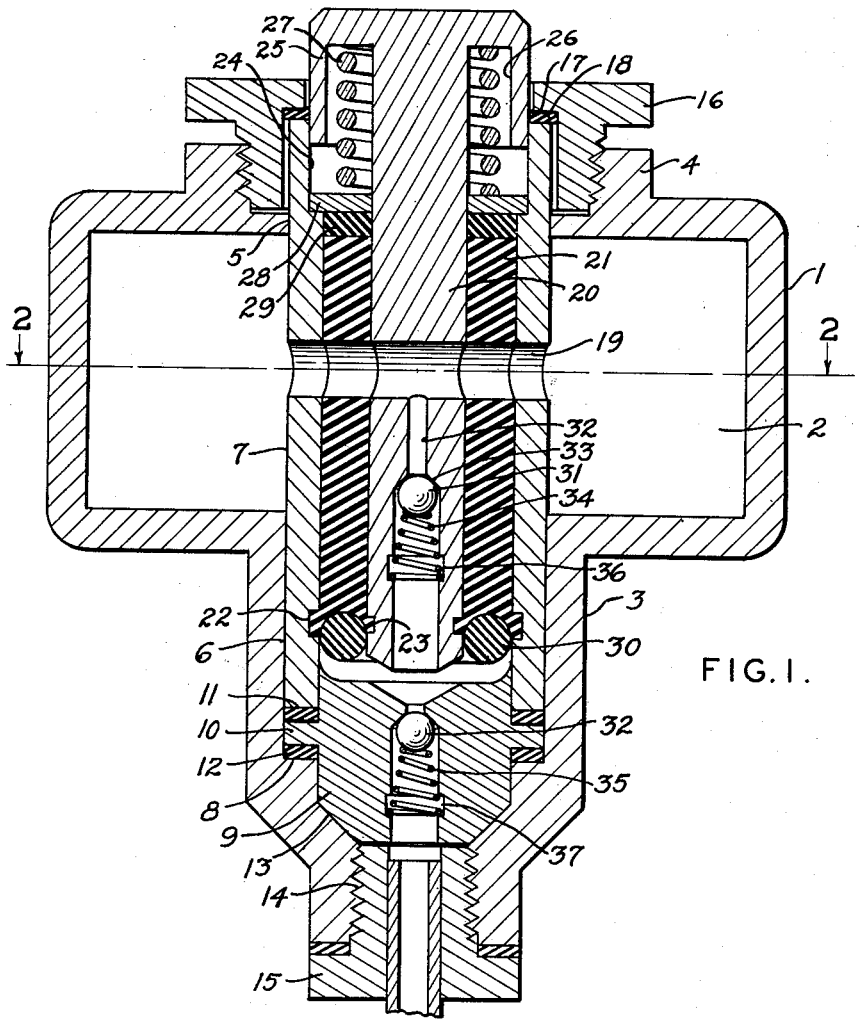
Fig. 1 shows a somewhat diagrammatic vertical sectional view of a pump embodying the invention.
Figure 2:
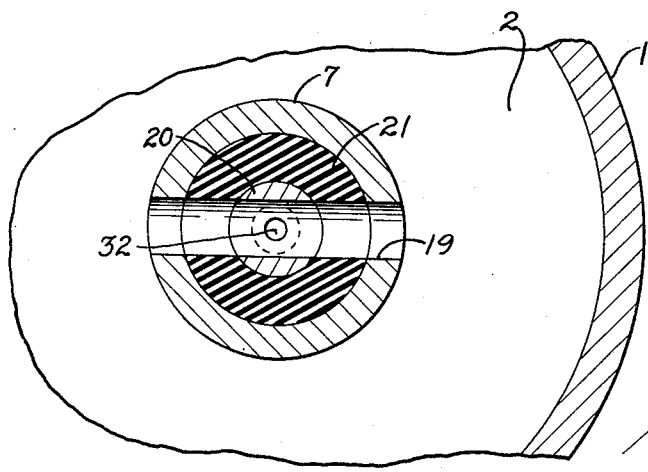
Fig. 2 shows a sectional plan view taken along the line 2—2 of Fig. 1.

The reference numeral 1 represents the main body casting of the pump, and contains a liquid supply chamber 2, in which the gasoline or other liquid which is to be pumped is contained.

It should be noted here that the parts are shown on an enlarged scale for convenience of illustration in the drawing, and that a pump designed for use with an automotive internal combustion engine would have a cylinder diameter of three eighths of an inch or less, with a piston stroke varying from about one sixteenth of an inch to zero, according to the power required from the engine. The means for operating and varying the stroke of the piston form no part of the present invention and are not shown.

The bottom of the casting 1 is provided with a downwardly extending projection 3, registering with an upward projection 4 from the top of the casting, and these projections are provided with cylindrical bores 5 and 6 to receive the cylinder 7. A shoulder 8 is formed at the bottom of the bore 6, and the bore is reduced and extended to receive the discharge valve holder 9, which is provided with a flange 10, the same diameter as the cylinder and sealed against leakage between the gaskets 11 and 12. The projection 3 is further extended and provided with a shoulder 13 and threads 14 to receive any suitable discharge connection 15 which fits closely against, but does not actually contact, the lower end of the member 9.

The upper projection 4 is screw threaded to receive the nut 16 which has the inner shoulder 17 to hold the cylinder 7 down against the sealing gaskets 8, 11, and 18. A transverse bore 19 extends through the cylinder 7, the piston rod 20, and the rubber bushing 21, which is formed of buna-n rubber, or the like, and bonded to the cylinder and piston rod, the thickness of the rubber bushing is made just sufficient to stand the strain of the maximum length of stroke required for the particular use to which the pump is to be put, and the length of the bushing below the transverse bore 19 is made sufficient to substantially eliminate displacement by the pressure variations to which the lower end of the piston is to be subjected in the operation of the pump. Where the pressure variations are to be very great, an "O ring" 39 of teflon plastic, or the like, is fitted between the cylinder and piston, and the inside of the cylinder is provided with a circular groove 22 to permit the rubber to more freely yield to the rolling action of the "O ring." A similar groove 23 may also be provided in the piston.

The bore of the cylinder 7 is enlarged as indicated at 24 to serve as a guide for the upper end of the piston 25. This member is internally bored at 26 to receive the spring 27, which is seated on the metal washer 28, which is slidable with respect to the cylinder and piston, and in order to prevent the bonding of the rubber bushing 21 to the washer 28, a cured rubber washer 29 of substantial thickness is placed between these members before the rubber bushing 21 is cured. The curing and bonding of the rubber bushing is done after the assembly of the members 7, 20, 27, 28, 29, and 30, so that these members form a permanent assembly, which is readily replaceable by merely removing the nut 16. In assembling the members prior to bonding, the spring 27 is placed under substantial compression, so that after bonding, the rubber will be held in substantial shear. Where the pump is to be used for accurate metering of small quantities under high pressure, the length of stroke is kept so short that the shear of the rubber is never relieved, but only slightly reduced, and its yieldability to the pressure at the lower end is kept at a minimum.

Inlet and outlet check valves 31 and 32 are provided in the piston 20 and the outlet valve holder 9 respectively, the piston being formed with an outlet passage 32 having a seat 33 to receive the valve, and the outlet valve holder being provided with a similar passage and seat. The inlet and outlet valve springs 34 and 35 are of conical shape, and the lower coils are received in grooves 36 and 37 as shown.

The invention may be modified in various respects as will occur to those skilled in the art and the exclusive use of all modifications as come within the scope of the appended claims is contemplated.

I claim:

1. In a pump, a casing forming a liquid supply chamber with a downwardly extending cylindrical recess, said casing having a circular opening in its upper face in alignment with the cylindrical recess, and a replaceable pre-assembled cylinder and piston unit adapted to be inserted and locked in the aligned circular opening and cylindrical recess, said unit comprising a cylinder, a piston of substantially smaller diameter than said cylinder, a yieldable bushing between said cylinder and said piston, said yieldable bushing being bonded to the cylinder and piston, and locking means for retaining said assembly in said casing.

2. In a pump, a casing forming a liquid supply chamber with a downwardly extending cylindrical recess, said casing having a circular opening in its upper face in alignment with the cylindrical recess, and a replaceable pre-assembled cylinder and piston unit adapted to be inserted and locked in the aligned circular opening and cylindrical recess, said unit comprising a cylinder, a piston of substantially smaller diameter than said cylinder, a yieldable bushing between said cylinder and said piston, said yieldable bushing being bonded to the cylinder and piston, and an O-ring of resilient material abutting an end of said bushing and intervening between said bushing and the fluid in said cylinder so as to reduce distortion of said bushing as a result of pressure variations, said O-ring being adapted to roll about its annular axis in response to movements of the piston, the direction of rotation of said O-ring corresponding to the movement of the lower surface of said yieldable bushing.

3. In a pump comprising a cylinder and piston of substantially less diameter than said cylinder, a packing in the annular space between said piston and said cylinder, said packing including a rubber bushing bonded to the piston and cylinder, an O-ring of resilient material abutting an end of said bushing and intervening between said bushing and fluid in said cylinder so as to reduce distortion of said bushing as a result of pressure variations, said O-ring being adapted to roll about its annular axis in response to movement of the piston, the direction of rotation of said O-ring corresponding to the movement of the abutting surface of said yieldable bushing.

4. In a pump comprising a cylinder and piston of substantially less diameter than said cylinder, a packing in the annular space between said piston and said cylinder, said packing including a rubber bushing bonded to the piston and cylinder, and an O-ring of resilient material abutting an end of said bushing and intervening between said bushing and fluid in said cylinder so as to reduce distortion of said bushing as a result of pressure variations, said O-ring being adapted to roll about its annular axis in response to piston movements, the direction of rotation of said O-ring corresponding to the movement of the abutting surface of said yieldable bushing, said piston and cylinder being formed with annular grooves adjacent said O-ring to receive said rubber bushing so as to permit said rubber bushing to more freely yield to the rolling action of said O-ring.

GEORGE R. ERICSON.

REFERENCES CITED

The following references are of record in the file of this patent:

UNITED STATES PATENTS

| Number | Name | Date |
|---|---|---|
| 1,331,233 | Berry | Feb. 17, 1920 |
| 1,629,495 | Frankenberg | May 24, 1927 |
| 2,183,510 | Thomas | Dec. 12, 1939 |
| 2,211,252 | Bremser | Aug. 13, 1940 |
| 2,298,007 | Goepfrich | Oct. 6, 1942 |
| 2,298,402 | Mercier | Oct. 13, 1942 |
| 2,340,020 | Roose et al. | Jan. 25, 1944 |
| 2,364,511 | Bossi | Dec. 5, 1944 |